United States Patent
Vacher

(10) Patent No.: US 7,287,296 B2
(45) Date of Patent: Oct. 30, 2007

(54) ARRANGEMENT FOR FIXING A WINDSCREEN WIPER BLADE TO A WIPER ARM

(75) Inventor: Pascal Vacher, Issoire (FR)

(73) Assignee: Valeo Systèmes d'Essuyage, La Verriere (FR)

(*) Notice: Subject to any disclaimer, the term of this patent is extended or adjusted under 35 U.S.C. 154(b) by 0 days.

(21) Appl. No.: 10/527,223

(22) PCT Filed: Sep. 8, 2003

(86) PCT No.: PCT/EP03/09950

§ 371 (c)(1),
(2), (4) Date: Mar. 10, 2005

(87) PCT Pub. No.: WO2004/024520

PCT Pub. Date: Mar. 25, 2004

(65) Prior Publication Data

US 2006/0010636 A1    Jan. 19, 2006

(30) Foreign Application Priority Data

Sep. 12, 2002 (FR) .................................. 02 11405

(51) Int. Cl.
*B60S 1/40* (2006.01)

(52) U.S. Cl. ................................. 15/250.32; 15/250.43

(58) Field of Classification Search ............ 15/250.32, 15/250.351, 250.43, 250.44
See application file for complete search history.

(56) References Cited

U.S. PATENT DOCUMENTS

| 3,049,743 A | * | 8/1962 | Graczyk et al. ......... | 15/250.32 |
| 3,082,463 A | * | 3/1963 | Bock et al. .............. | 15/250.32 |
| 3,550,180 A | | 12/1970 | Arman | |
| 3,593,362 A | * | 7/1971 | Arman .................... | 15/250.32 |
| 3,657,762 A | * | 4/1972 | Arman .................... | 15/250.32 |
| 3,768,113 A | * | 10/1973 | Kolb ....................... | 15/250.32 |
| 3,780,394 A | * | 12/1973 | Quinlan et al. .......... | 15/250.32 |
| 3,831,222 A | * | 8/1974 | Kushida .................. | 15/250.32 |
| 3,900,917 A | * | 8/1975 | Baut et al. .............. | 15/250.32 |
| 4,321,725 A | * | 3/1982 | Journee .................. | 15/250.32 |
| 5,611,103 A | * | 3/1997 | Lee ......................... | 15/250.32 |

FOREIGN PATENT DOCUMENTS

| DE | 1058382 | 5/1959 |
| DE | 1108580 | 6/1961 |
| FR | 2070567 A | 8/1971 |

* cited by examiner

*Primary Examiner*—Gary K. Graham
(74) *Attorney, Agent, or Firm*—Osha Liang LLP

(57) ABSTRACT

An arrangement for fixing a windscreen wiper blade to a wiper arm includes a through transverse swivel pin which is intended to form a pivot connection with the arm and said arm is equipped with an end rod. The arrangement includes an independent piece, known as an adapter, which is mounted on the blade and the above-mentioned rod is inserted longitudinally therein.

10 Claims, 4 Drawing Sheets

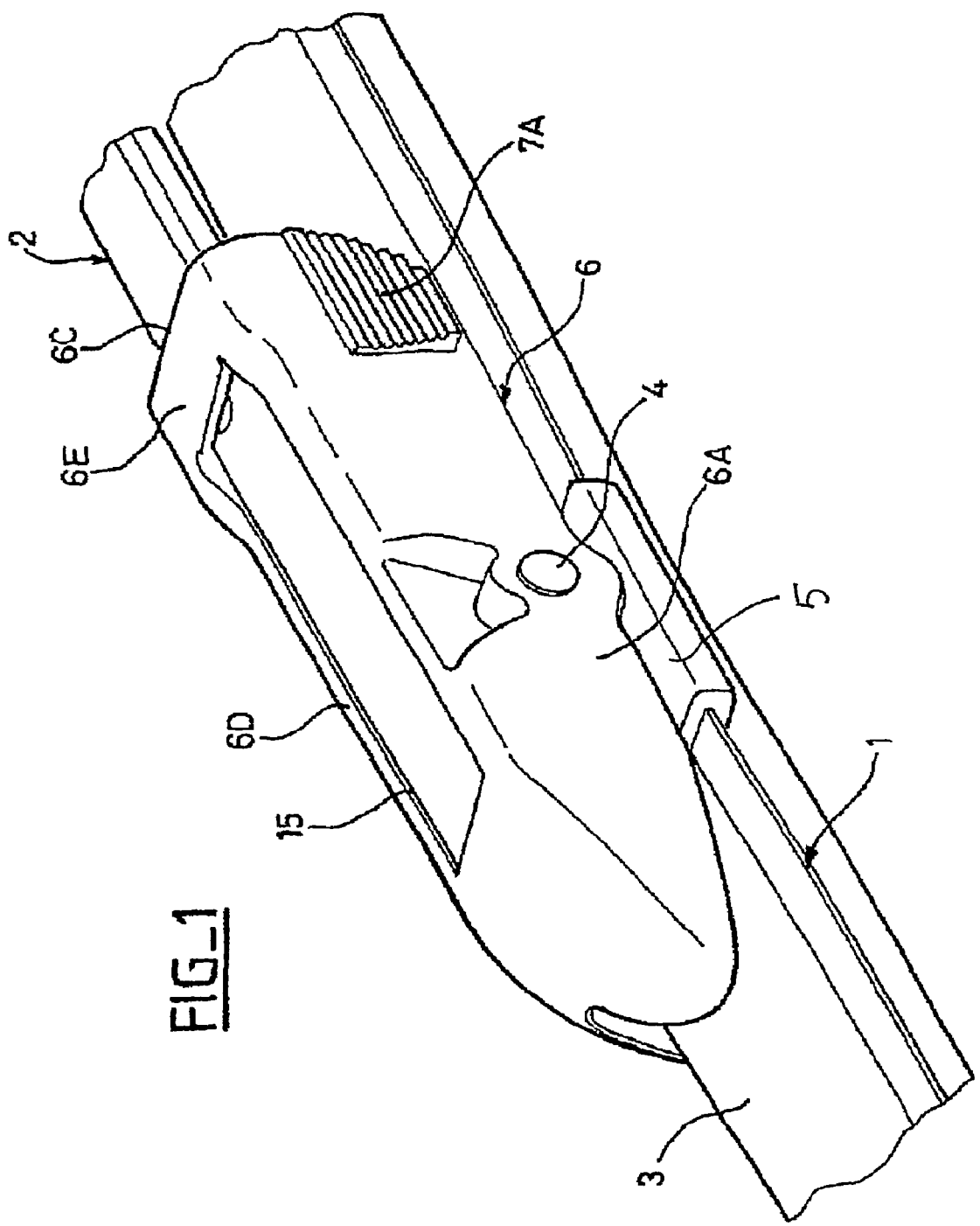
FIG_1

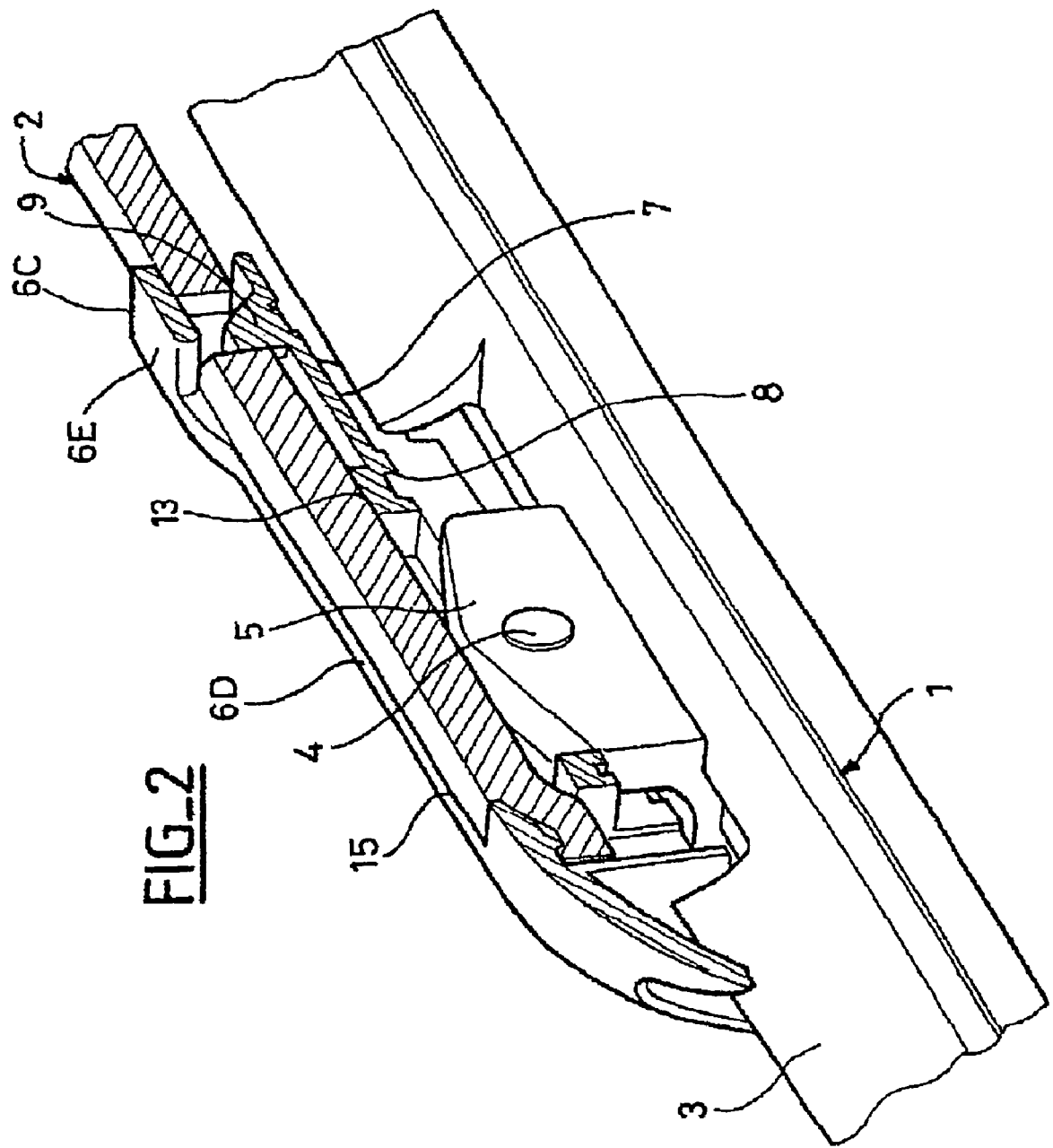
FIG_2

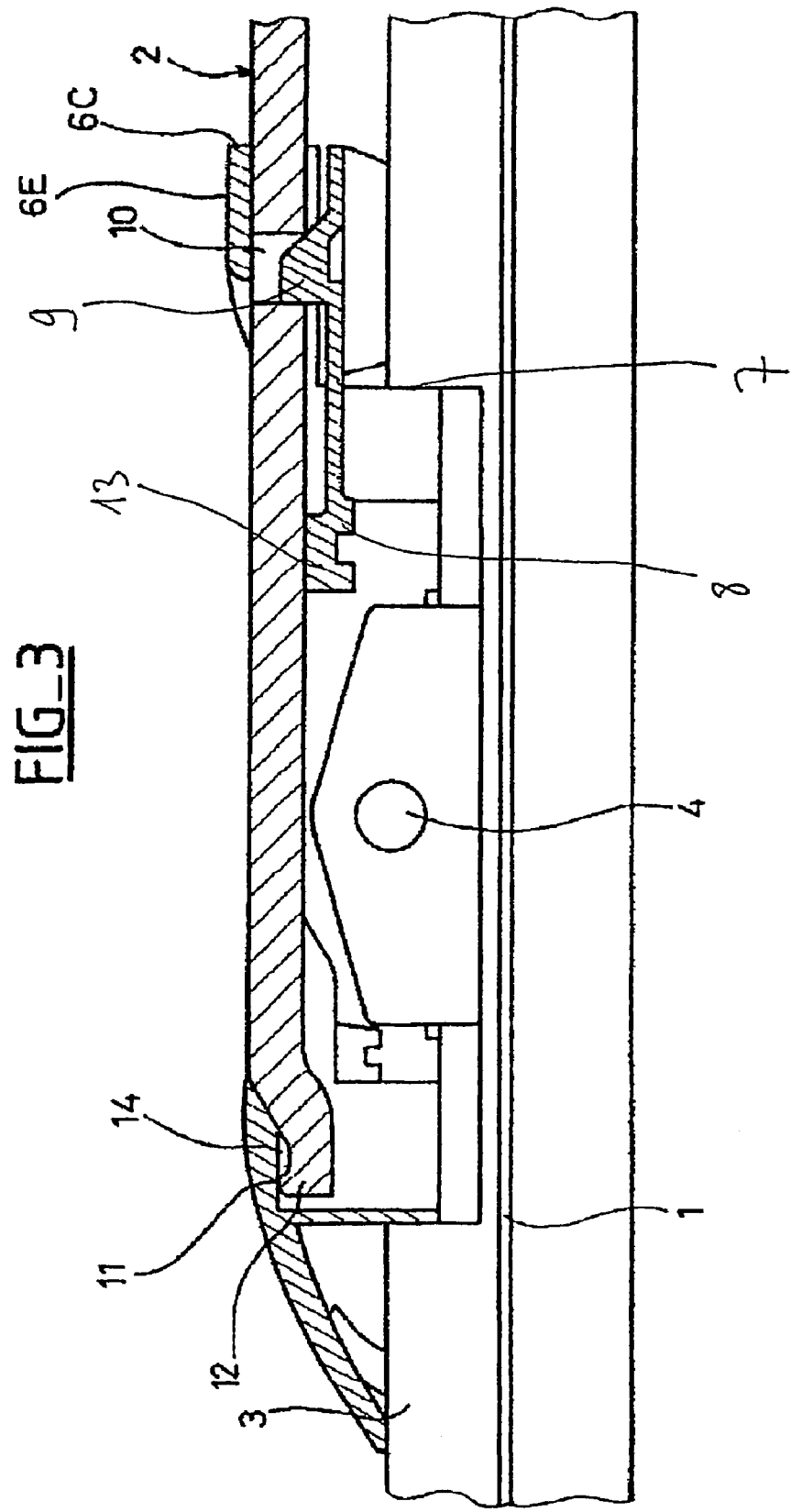

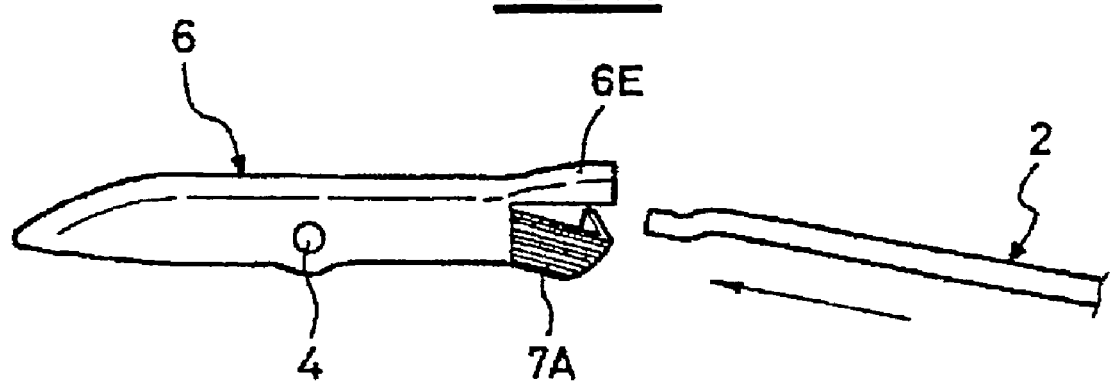
FIG_4
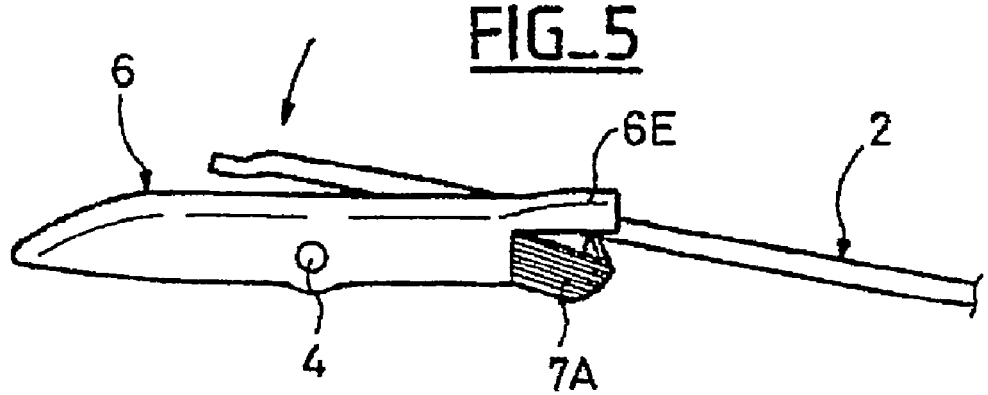
FIG_5
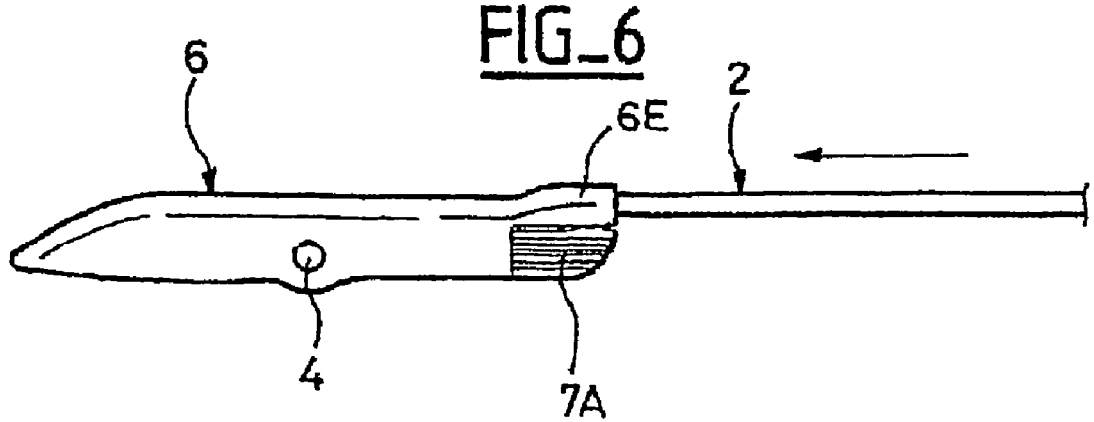
FIG_6

ARRANGEMENT FOR FIXING A WINDSCREEN WIPER BLADE TO A WIPER ARM

BACKGROUND OF THE INVENTION

The present invention relates to an arrangement for fixing a windscreen wiper blade to an arm.

It concerns more precisely an arrangement for fixing a windscreen wiper blade to an arm, this blade having a transverse pivot spindle intended for pivoting connection with the arm.

In a known fashion, such a blade is adapted to a specific type of arm referred to as the yoke type as it has an end with a U-shaped profile made from steel sheet produced by rolling around the arm. According to a known embodiment, an independent piece called an adapter is mounted on the blade, this adapter being provided with facing orifices on its flanges and intended to be snapped onto the spindle and the end of the U-shaped arm is fitted and locked on this adapter, the opening of the U being directed towards the blade. However, these yoke arms are complex and expensive with regard to their manufacture.

To resolve this problem and to allow the mounting of arms with a particularly simple design consisting of arms with an end rod, the invention proposes an arrangement for fixing a windscreen wiper blade to an arm, the said blade having a through transverse pivot spindle intended for the pivoting connection with the arm and the arm having an end rod, characterised in that it comprises an independent piece known as an adapter mounted on the blade and in which the rod is fitted longitudinally.

SUMMARY OF THE INVENTION

According to a preferred embodiment, the adapter has a U-shaped cross section whose flanges each have an orifice for snapping onto the spindle and an end of which, referred to as the entry end, is open, and the adapter has means for the transverse and longitudinal locking of the arm.

Advantageously, a longitudinal locking means consists of an articulated part provided with a tenon fitted in an orifice arranged on the rod, when the latter is fitted.

In this case, preferably, this locking means consists of a cross-member articulated on the adapter by means of at least one flexible tongue, carrying the tenon and forming with the web of the adapter, at its entry end, a channel for positioning the rod.

Advantageously, another longitudinal locking means consists of a housing arranged on the adapter in which a stop on the rod comes into engagement, when the latter is fitted.

In this case, preferably, the said housing is arranged on the web of the adapter close to its end opposite to the entry end and the said stop is arranged at the end of the rod.

The housing can be conformed by virtue of a profiled snapping-in rib on the internal surface of the adapter and the stop can be a profiled catch at the end of the rod.

In addition, preferably, the adapter comprises at least one fixed cross-member for the transverse locking of the rod.

Preferably, the web of the adapter is provided with a longitudinal opening allowing passage of the rod while it is fitted.

BRIEF DESCRIPTION OF THE DRAWINGS

The invention is described below in more detail with the help of the figures showing only one preferred embodiment of the invention.

FIG. 1 is a perspective view of the fixing arrangement according to the invention.

FIG. 2 is a similar perspective view in longitudinal section.

FIG. 3 is a view in longitudinal section of the fixing arrangement according to the invention.

FIGS. 4 to 6 are front views illustrating the fitting of the arm rod.

DETAILED OF THE DESCRIPTION

The fixing arrangement according to the invention is depicted in FIGS. 1 to 3.

An arm 2 is mounted on a blade (1, 3, 5, 4). This arm 2, connected in a known fashion to a rotation drive, allows the movement of the blade on the window of a car, in particular. This blade (1, 3, 5, 4) is of a known type and has a through transverse pivot spindle 4 fixed to a piece 5 integral with the pieces 1 and 3 consisting of the wiper arm and its reinforcement vertebrae. Such a blade is in a known manner intended to receive an independent piece called an adapter, on which an arm with a yoke is fitted.

The invention makes it possible to mount an end arm as a rod for fitting in an adapter 6.

To do this, the plastic adapter 6 is a piece with a U-shaped cross section whose flanges 6A, 6B each have an orifice for snapping onto the spindle 4 and whose end 6C, referred to as the entry end, is open. This entry end 6C is intended to receive the end rod of the arm 2.

The adapter 6 also has means for the transverse longitudinal locking of the fitted arm.

A first longitudinal locking means consists of an articulated part consisting of a cross-member 7 articulated on the adapter by at least one flexible tongue 8 and carrying a tenon 9. As will be described below more precisely, this tenon 9 is fitted in an orifice 10 arranged on the rod 2 when the latter is fitted. This cross-member 7 forms with the web 6D of the adapter at its entry end 6C a channel for positioning the rod.

A second longitudinal locking means consists of a housing 11 arranged on the internal surface of the web 6D of the adapter and in which a stop 12 on the rod engages, when the latter is fitted. This housing 11 is arranged close to the end opposite to the entry end 6C and this stop 12 is arranged at the end of the rod of the arm 2. Advantageously, this housing 11 is formed by virtue of a profiled snapping-in rib 14 and the stop 12 is a profiled catch at the end of the rod.

The adapter also has at least one fixed cross-member 13 for transverse locking of the rod. This cross-member 13 is arranged at a free position between the two ends of the adapter, having regard to the size of the piece 5 supporting the spindle 4.

The web 6D of the adapter is provided with a longitudinal opening 15 allowing the passage and fitting of the rod when it is slipped in, as will now be described with reference to FIGS. 4 to 6.

The adapter 6 is mounted on the arm 2 after it is fitted on the spindle 4. To do this, as depicted in FIG. 4, the positioning channel formed by the cross-member 7 and the web 6D of the adapter is opened by moving the cross-member 7 downwards (looking at the figure) by virtue of the elastic deformation of the tongue 8. To assist this manipulation, the flanks of the cross-member 7 are provided with gripping ribs 7A.

With its end inclined upwards (looking at the figure), the end of the rod of the arm 2 is introduced into this channel over a certain length and passes into the longitudinal opening 15. Thus the rod is easily slipped above the fixed cross-member 13. When the end of the rod is close to the end of the opening 15 opposite to the entry opening 6C, as depicted in FIG. 5, the rod is folded towards the inside of the adapter.

It then suffices to push it longitudinally, as depicted in FIG. 6, in order to snap its stop 12 into the housing 11 of the adapter.

Advantageously, the rod of the arm 2 and the adapter 6 are profiled so that the slipped-in rod fits flush with the external surface of the web 6D level with the longitudinal opening 15 of the web 6D of the adapter, for aerodynamic, aesthetic and size reasons. The rod is therefore non-rectilinear, with an inclined shape at its end in order to be housed under the web 6D of the adapter. For its part, the adapter is raised close to its entry opening 6C, where it forms a bridge 6E between the entry opening 6C and the longitudinal opening 15.

The invention claimed is:

1. An arrangement for fixing a windscreen wiper blade on an arm, said blade having a through transverse pivot spindle configured to form a pivoting connection with said arm and said arm having an end rod, the arrangement comprising:
    an adapter mounted on said blade, in which said rod is fitted longitudinally;
    a web disposed on a top portion of the adapter with a longitudinal opening allowing passage of said rod when said rod is fitted; and
    an entry opening provided on an end portion of the adapter to accept the rod, wherein the entry opening is formed separately from the longitudinal opening, and wherein when the rod has been locked in the adapter, the rod is disposed through the entry opening without being disposed through the longitudinal opening.

2. The arrangement according to claim 1, wherein said adapter comprises:
    a substantially U-shaped cross section whose flanges each have an orifice for snapping onto said spindle an entry end of which is open, and
    means for the transverse and longitudinal locking of said arm.

3. The arrangement according to claim 2, wherein the longitudinal locking means comprises an articulated part provided with a tenon fitted in an orifice arranged on the rod, when the latter is fitted.

4. The arrangement according to claim 3, wherein the locking means comprises a cross-member articulated on the adapter by means of at least one flexible tongue, carrying said tenon and forming, with the web of the adapter at its entry end, a positioning channel for the rod.

5. The arrangement according to claim 2, wherein the longitudinal locking means comprises a housing arranged on the adapter in which a stop on the rod comes into engagement, when the latter is fitted.

6. The arrangement according to claim 5, wherein said housing is arranged on said web of the adapter close to an end of the adapter opposite to the entry end and said stop arranged at the end of the rod.

7. The arrangement according to claim 6, wherein said housing is conformed by virtue of a profiled snapping-in rib on the internal surface of the adapter and said stop is a profiled catch at the end of the rod.

8. The arrangement according to claim 2, wherein the adapter has at least one fixed cross-member for the transverse locking of the rod.

9. The arrangement according to claim 1, wherein the longitudinal opening allows an upwardly inclined passage of said rod when said rod is fitted.

10. The arrangement according to claim 1, wherein said adapter further comprises an opening on a side of said adapter to allow transverse passage of said rod.

* * * * *